INVENTOR
HELMUTH G. BRAENDEL

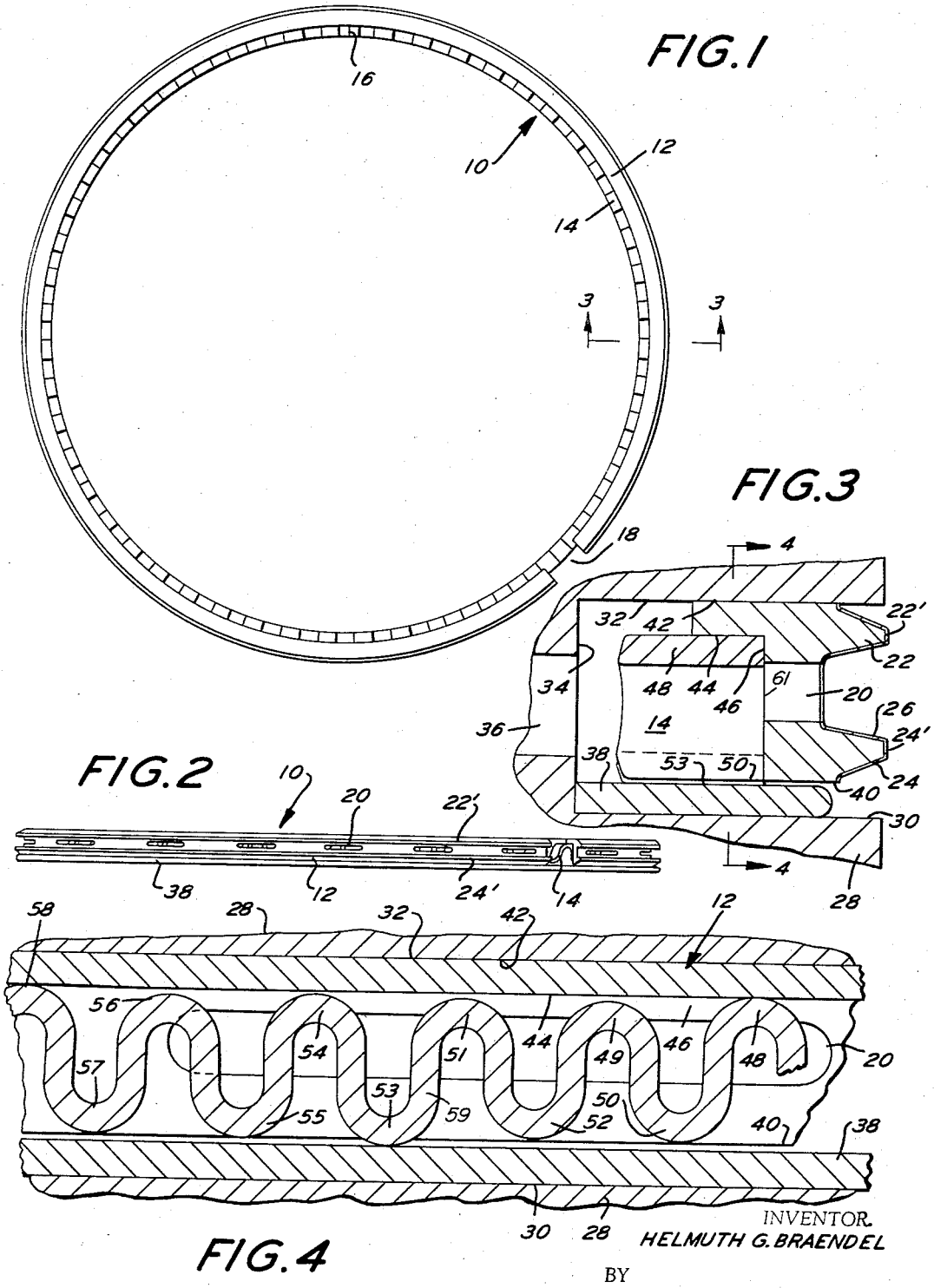

BY Seidel & Gonda

ATTORNEYS.

United States Patent Office 3,370,858
Patented Feb. 27, 1968

3,370,858
PISTON RING ASSEMBLY
Helmuth G. Braendel, Malvern, Pa., assignor to Gould-National Batteries, Inc., St. Paul, Minn., a corporation of Delaware
Continuation-in-part of application Ser. No. 378,880, June 29, 1964. This application Aug. 23, 1965, Ser. No. 481,738
2 Claims. (Cl. 277—139)

This invention relates to a novel piston ring assembly for use in the ring-receiving grooves of pistons of internal combustion engines as well as other engines.

This application is a continuation-in-part of my co-pending patent application Ser. No. 378,880 filed on June 29, 1964, now Patent No. 3,326,561, and entitled, Piston Ring Assembly.

There are basically two types of piston rings, compression rings and oil rings. The essential purpose of a compression ring is to provide a positive seal between the piston and cylinder wall and between the ring and the sides of the ring groove in the piston. It must do this quickly and effectively, and then maintain the seal for long life. When this is not accomplished, raw fuel and gases under high pressure blow by the ring, thereby wasting power, destroying lubrication and setting up immediate wear which may lead to scuffing and scoring of the cylinder walls.

The essential function of an oil ring is not to scrape oil, but to meter a very thin uniform film of oil to the compression ring belt. The oil film must be such that it will efficiently lubricate against wear, provide a seal between the face of the compression rings and the cylinder wall, transfer combustion heat quickly through the cylinder walls to the engine coolant, and in some cases, provide an oil drainage passage to the interior of the piston. The oil ring must meter the oil along the entire stroke of the piston, and against the surface which is never truly round or truly straight. All cylinders, whether new or worn, are subject to some degree of distortion induced by thermal or structural causes. Therefore, an oil control ring which is to meter such a film of oil to the compression ring belt must be flexible enough to conform to variations from perfect shape with little change in pressure around the entire circumference.

If the oil ring does not accomplish its function, it will scrape excessively along those sections of the cylinder which distort inwardly and will meter too much oil along such sections of the cylinder which distort outwardly. This lack of ability to conform to changes in contour of the cylinder walls tends to induce scuffing and at the same time permits excessive consumption of oil. A portion of the oil scraped from the cylinder walls and admitted to the rear of the piston ring groove can leak back to the cylinder through the clearance between the groove and the oil ring if the latter is not kept tightly sealed against the top side of the piston groove.

When a conformable oil ring assembly is installed in a piston ring groove, the equalizer or spring is subjected to a slight amount of snaking action. I have found that this snaking action may be utilized to induce an axial sealing load on the ring assembly by providing the ring with a shoulder at the upper side thereof. The equalizer top is against the shoulder on the ring and the equalizer bottom is adjacent the bottom of the groove. When the piston is made of aluminum, the lower surface of the groove has been found to be subjected to excessive wear. These problems have been solved by utilizing a steel spacer which acts as a wear plate, and by constructing the equalizers so as to intentionally provide for a uniform snaking action. In this manner, a positive side sealing action is attained rather than a random side sealing action. Thus, the present invention takes advantage of the snaking action which normally is considered to be a disadvantage.

It is an object of the present invention to provide a novel piston ring assembly.

It is another object of the present invention to provide a piston ring assembly whose cylinder contacting periphery has a high degree of flexibility or conformability so as to enable it to maintain full contact with the cylinder wall throughout its periphery regardless of changes in contour of the cylinder wall.

It is still a further object of the present invention to provide a novel piston oil control ring assembly which is maintained in sealing engagement with the top side of its piston ring groove at all times to prevent oil leakage back to the cylinder walls and the compression rings.

It is another object of the present invention to provide a piston ring assembly wherein the equalizer has cycles which do not provide for contact with the bight portions of each cycle.

It is still anohter object of the present invention to provide a piston ring assembly which prevents excessive wear on pistons made from aluminum.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a top plan view of a piston ring assembly constructed in accordance with the present invention.

FIGURE 2 is a side elevation view of the assembly shown in FIGURE 1.

FIGURE 3 is an enlarged detailed sectional view taken along the line 3—3 in FIGURE 1.

FIGURE 4 is an enlarged detailed sectional view taken along the line 4—4 in FIGURE 3.

Referring to the drawing in detail, wherein like numerals indicate like elements, there is shown in FIGURE 1 a piston ring assembly designated generally as 10.

Figure 5:
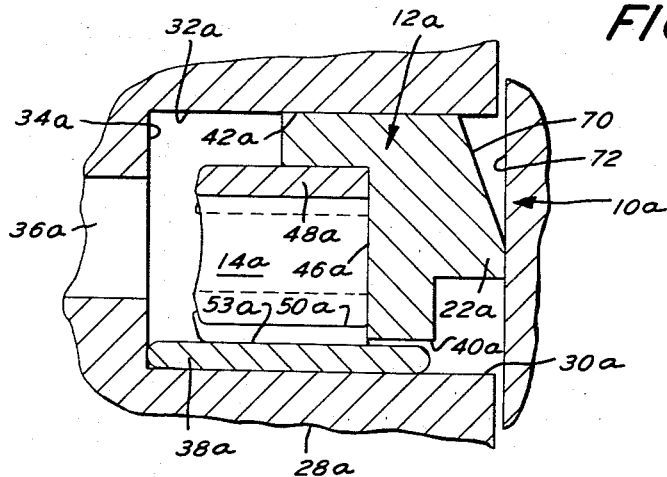
FIGURE 5 is an enlarged detailed sectional view similar to FIGURE 3 but illustrating another embodiment of the present invention.

The assembly 10 includes a split rail 12 and an axially corrugated equalizer or expander ring 14. The ends of the equalizer 14 mate in flat axially extending surfaces which are in abutting contact at the juncture 16. The free ends of the split rail 12 are spaced from one another so as to define a gap 18. The sides of the gap 18 may be larger or smaller as desired.

As shown more clearly in FIGURES 2–4, the rail 12 is provided with radially directed oil passages 20 at spaced points around its periphery. The equalizer 14 is a generally annular resilient, compressible and sinusoidally corrugated ring. The ends of equalizer 14 are freely abutting one another at juncture 16. If desired, the ends of equalizer 14 may be connected together by any interlocking means well known to those skilled in the art.

As shown more clearly in FIGURE 3, the rail 12 is provided with a pair of axially spaced, radially outwardly extending annular projections 22 and 24. In cross section, the projections 22 and 24 have the appearance of truncated triangles thereby providing axially spaced peripheral faces 22' and 24' respectively. The outer periphery of the rail 12 may be chrome plated as indicated at 26. The chrome plating 26 on the peripheral surfaces 22' and 24' preferably as a minimum thickness of .004 inch.

There is partially illustrated a piston 28 made from a metal such as aluminum and having a peripheral groove into which the assembly 10 is adapted to be mounted. The groove is provided with a lower or bottom surface 30, an upper or top surface 32 axially spaced therefrom, and a bottom axially extending surface 34. A radially outwardly directed oil passage 36 is provided which communicates with the groove. A flat annular spacer 38 is provided on the bottom surface 30. Spacer 38 is preferably made from steel and may have a thickness of .015 to .060 inch depending on ring width and diameter. The purpose of spacer 38 is to prevent excessive wear on the surface 30.

The rail 12 is provided with a bottom surface 40 axially spaced from the bottom surface 30 of the groove. The top surface 42 of the rail 12 is in intimate sealing contact with the top surface 32 of the groove. As shown more clearly in FIGURE 4, surface 40 is also axially spaced from the upper surface of spacer 38. The rail 12 is biased to the position illustrated wherein surfaces 42 and 32 are in intimate sealing contact by means of the equalizer 14.

To accommodate the equalizer 14, the rail 12 is undercut so as to provide surface 44 parallel to surface 42 and an axial surface 46 which is substantially perpendicular thereto. It will be noted that the top surface 42 is of greater length in a radial direction as compared with the surface 40.

In order to obtain a positive snaking action on the equalizer 14 and thereby provide positive side sealing between surfaces 32 and 42 as opposed to random sealing, the equalizer 14 is formed with axially offset cycles. Thus, as shown more clearly in FIGURE 4, the bight of cycle 48 contacts the surface 44 on the rail 12. The bights 49, 50 and 52 do not contact either surface 44 or the upper surface of spacer 38. The bight 53 of the next cycle contacts the upper surface of the spacer 53. The next three bights, namely 54, 55 and 56 do not contact either surface 44 or the upper surface of spacer 38. Thereafter, the pattern is repeated with the bight 58 of the next cycle contacting the surface 44. Adjacent bights on the equalizer 14 are interconnected by axially directed portions 59. As is best seen in FIGURE 3, the bights and the axially directed portions 59 include outer peripheral surfaces 61 which contact the axial surface 46 on the rail 12.

Thus, as illustrated in FIGURE 4 every fourth bight contacts either the upper surface of the spacer 38 or the surface 44 on the rail 12. The intermediate bights have been preformed so as to have a smaller axial length. In this manner, when the equalizer is compressed a snaking action is intentionally provided which will provide alternate contact by the equalizer with the rail and the spacer. Thus, it will be noted that the equalizer 14 exerts a radially outwardly directed biasing force on the rail 12 and exerts an axial force so as to maintain intimate contact between surfaces 32 and 42.

While the present invention may be utilized wherever piston ring assemblies have been utilized heretofore, it finds its greatest attraction where oil consumption is a major problem such as with commercial vehicles in the nature of trucks, buses, aircraft, etc. Due to the radially outwardly directed biasing force of the equalizer 14, and the flexibility of the split rail 12, a force is exerted on the rail to urge it to conform to the contour of the cylinder wall. This is especially true in view of the fact that the equalizer 14 is sinusoidally corrugated whereby a uniform radially outwardly directed force is applied to the rail 12 when the equalizer is compressed. Because of the good sealing engagement between surfaces 32 and 42, oil which is scraped from the cylinder walls will flow through the oil drainage passages 20, through the equalizer 14 and into the piston oil passage 36. Oil flowing into the interior of the piston groove will be prevented from leaking past the upper surface 42 of the rail 12 and back to the cylinder and the compression rings.

As used hereinafter, bight 48 may be referred to as a first bight contacting a surface on the rail. As used hereinafter, bight 53 may be referred to as a second bight contacting a surface on the spacer. As used hereinafter, any one of the bights 49–52 may be referred to as a third bight which is spaced from the rail and the spacer.

In FIGURE 5, there is illustrated a detailed section similar to FIGURE 3 but illustrating another embodiment of the present invention designated generally as 10a. The assembly 10a is identical with the assembly 10 except as will be made clear hereinafter. Accordingly, corresponding structure is provided with corresponding numeral followed by the letter "a."

The assembly 10a includes a ring having only one radially outwardly extending annular projection 22a. Projection 22a terminates at its outer periphery in a peripheral face for engagement with the cylinder wall 72. The rail 12a is provided with a bevelled surface 70 extending from the cylinder wall engaging face to the surface 42a at an angle of approximately 20 degrees. Since only one projection is provided on the rail 12a, it is more centrally located but slightly below a horizontally disposed median line. In connection with this assembly 10a, the clearance at the bottom of the ring is sufficient so that the oil passage may be omitted, if desired. In all other material respect, the assembly 10a is identical with the assembly 10.

Figure 6:
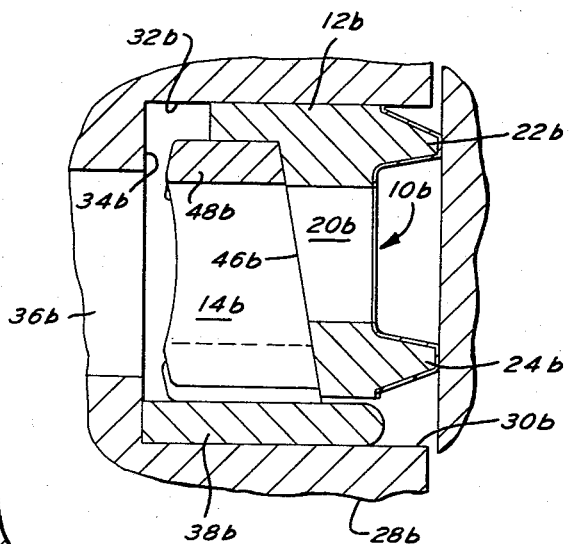
FIGURE 6 is an enlarged detailed sectional view similar to FIGURE 3 but illustrating another embodiment of the present invention.

In FIGURE 6, there is illustrated another embodiment of the present invention wherein the assembly is designated at 10b. The assembly 10b is identical with the assembly 10 except as is made clear hereinafter. Accordingly, corresponding structure is provided with corresponding numerals followed by letter "b."

The rail 12b is provided with a surface 46b disposed on a bias so as to form an angle with a vertical line of approximately 10 degrees. The equalizer 14b is provided with a corresponding mating side surface. Hence, in addition to inducing top side sealing between the surfaces 12 and 32b and the top surface on the ring 12b, the equalizer 14b induces a radially outwardly directed force on the ring 12b to cause the sealing faces on the projections 22b and 24b to engage the cylinder walls. That is, a component of a radially directed force will add to the existing axially directed force of the equalizer.

Figure 7:
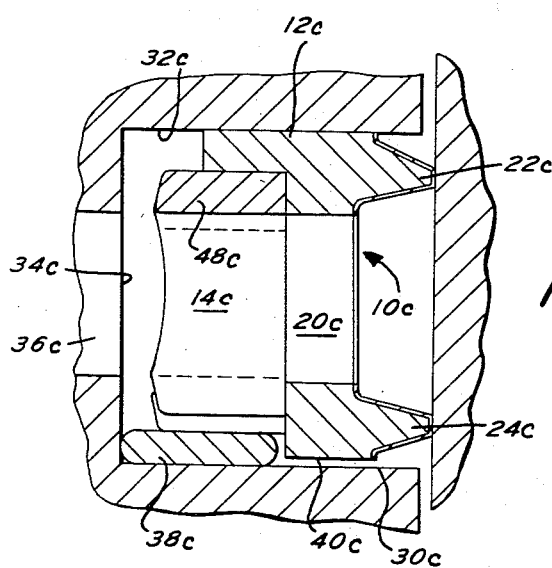
FIGURE 7 is an enlarged detailed sectional view similar to FIGURE 3 but illustrating another embodiment of the present invention.

In FIGURE 7, there is illustrated a detailed sectional view of another embodiment of the present invention and the assembly is designated generally as 10c. The assembly 10c is identical with the assembly 10 except as will be made clear hereinafter. Hence, corresponding structures are provided with corresponding numerals followed by the letter "c."

If greater stability of the rail is desired, the projections 22c and 24c may be spaced further apart. In this regard, the spacer 38c is now narrower in width and occupies only a space below the equalizer 14c so as to have its outer periphery radially inwardly from the surface 40c on the rail 12c. Thus, it will be noted that the surface 40c is between horizontal planes containing the bottom surface 30c of the groove and the upper surface of the spacer 38c.

The present invention may be embodied in other specific forms without departing from the spirit or essential attributes thereof and, accordingly, references should be made to the appended claims, rather than to the foregoing specification as indicating the scope of the invention.

I claim:

1. A piston ring assembly for use in and with the cylinder piston of an internal combustion engine or the like comprising a single annular rail, said rail having a top surface for establishing intermittent contact with the top of a piston groove, said rail having at least one radially outwardly extending circumferential projection terminating in a cylinder wall engaging surface, a lower surface on said rail below said top surface and substantially parallel thereto, an axial surface on said rail intersecting said lower surface, a spacer ring below said rail, an annular resilient compressible means in biasing engagement with said lower surface and said axial surface, said means also contacting said ring, said means being an axially corrugated member having a plurality of circumferentially spaced axially extending bights, said bights including first bights in contact with said lower surface, second bights in contact with said ring, and intermediate bights between the first and second bights, first, second and intermediate bights being disposed in repetitive distribution about the circumference of said corrugated member, said intermediate bights having an axial length which is shorter than the axial length of the first and second bights so that said intermediate bights are out of contact with the ring and the lower surface, and the outer diameter of the ring being disposed between the outer diameter of the corrugated member and said wall engaging surface on the circumferential projection, said corrugated member being made from a flat material so that said first and second bights on said member have line contact with said ring and lower surface, and adjacent bights on said member being interconnected by generally axially directed portions having outer peripheral surfaces in contact with said axial surface on the rail.

2. A piston ring assembly in accordance with claim 1, said axial surface being disposed at an acute angle with respect to said top surface of said rail, and said resilient compressible means having a correspondingly angled surface juxtaposed to said axial surface and in contact therewith to apply to said surface a generally outwardly directed biasing force having a component urging the top surface into contact with the top of the piston groove.

References Cited

UNITED STATES PATENTS 3,000,678  9/1961  Braendel _____ 277—139
3,056,607  10/1962  Knoebel _____ 277—160
3,151,868  10/1964  Beck et al. _____ 277—144

LAVERNE D. GEIGER, *Primary Examiner.*

J. S. MEDNICK, *Assistant Examiner.*